Patented Sept. 5, 1939

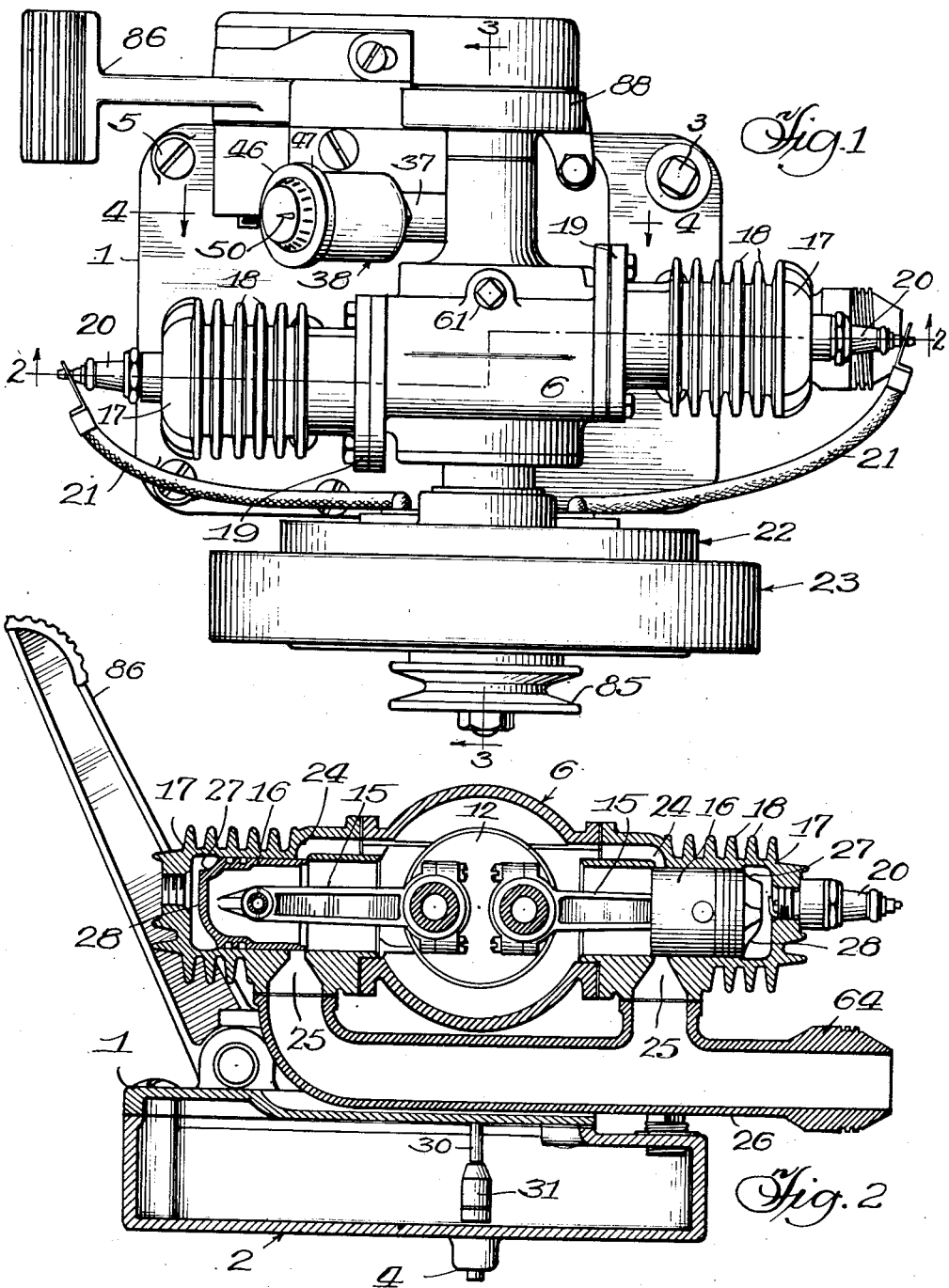

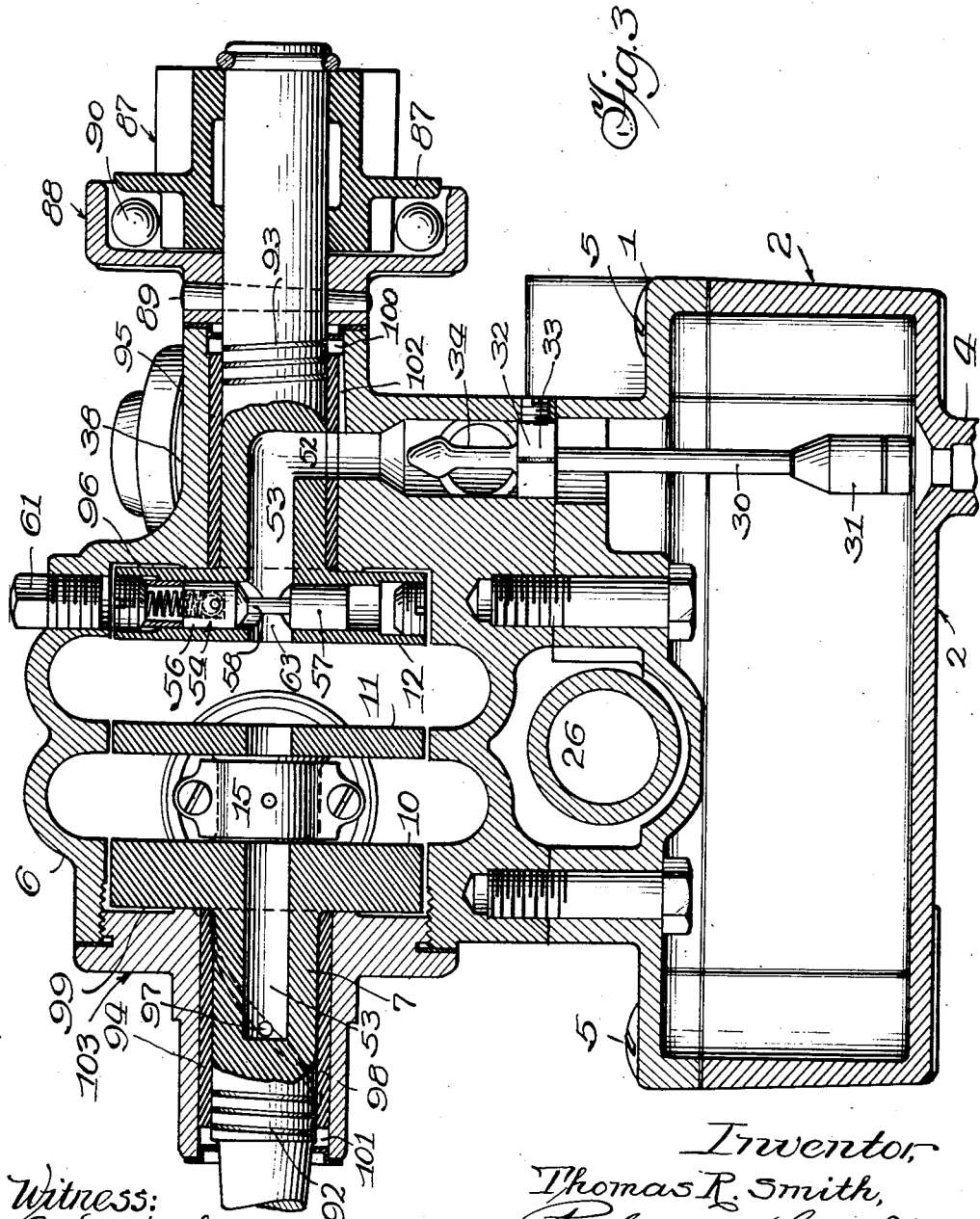

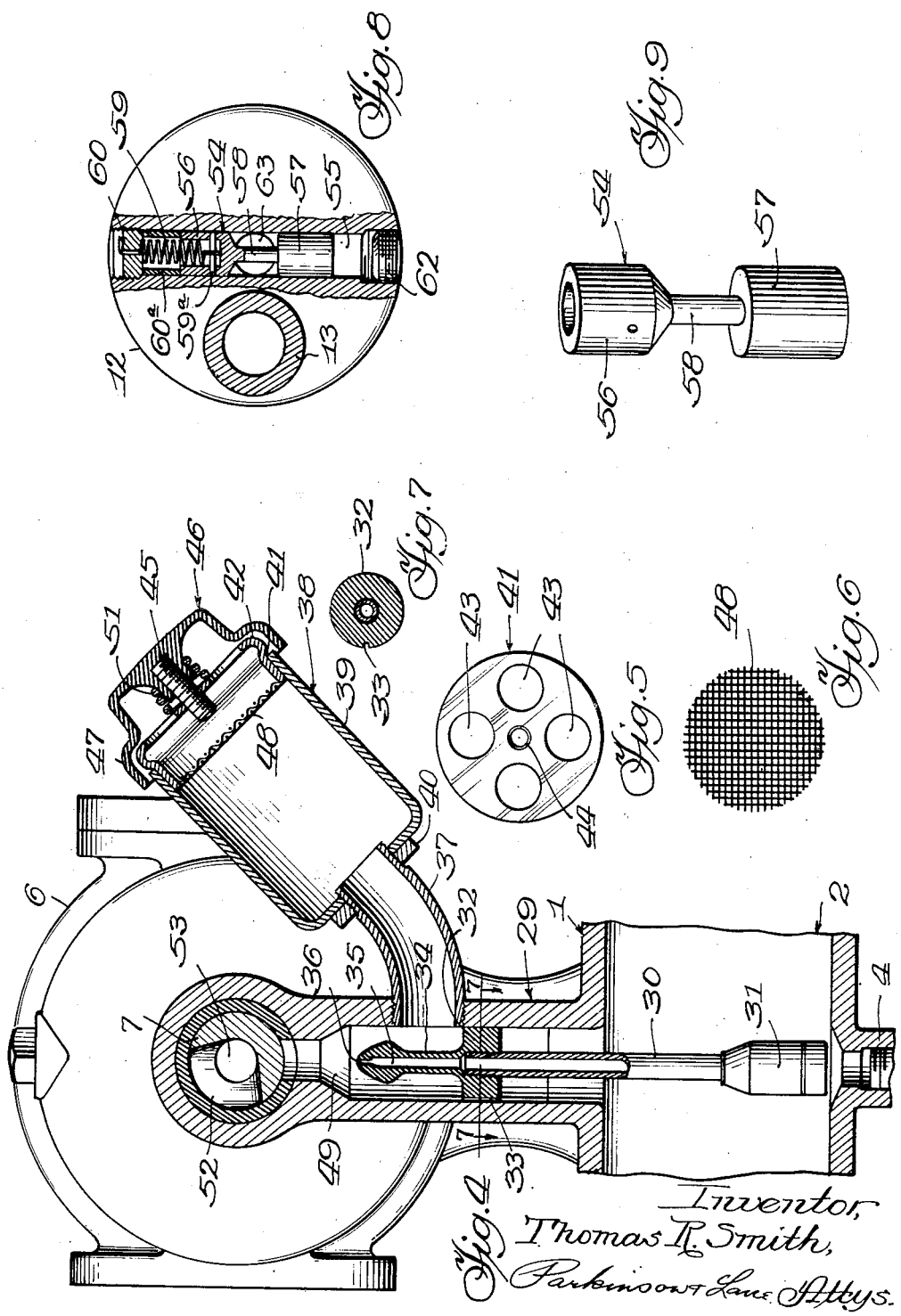

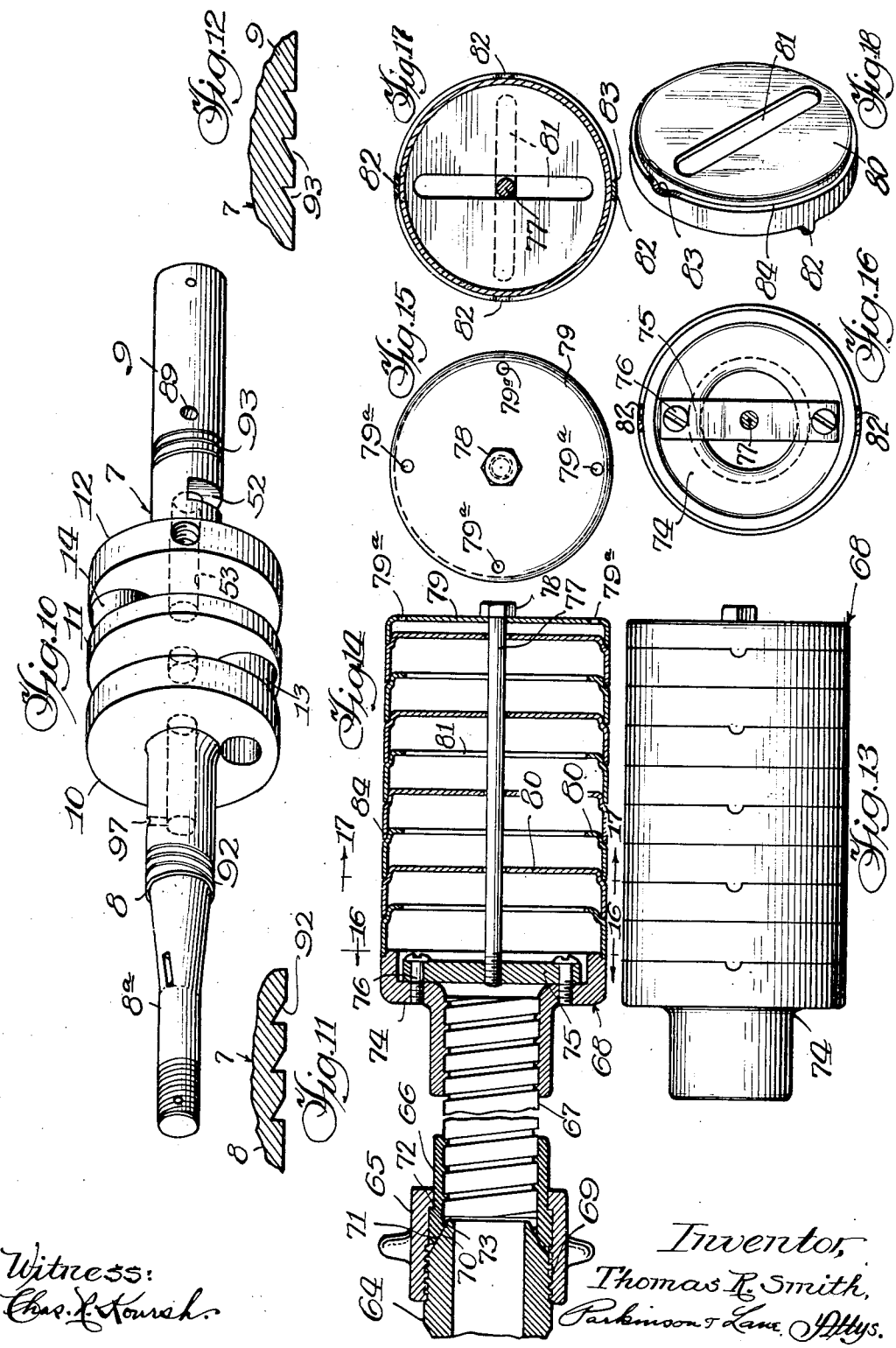

2,172,147

UNITED STATES PATENT OFFICE 2,172,147

COMBUSTION ENGINE

Thomas R. Smith, Newton, Iowa, assignor to The Maytag Company, Newton, Iowa, a corporation of Delaware Application September 17, 1936, Serial No. 101,185

15 Claims. (Cl. 123—73)

The present invention relates to combustion engines and more particularly to a novel construction of a two-cylinder, two-cycle engine, and in the various parts and details of construction.

Among the objects of the present invention is to provide a novel combustion engine of compact and unique construction, operation and design, and a novel combination of cooperating parts so constructed, arranged and related as to give maximum efficiency in operation. While the disclosed embodiment is of general application, it is particularly well adapted for use in operating washing machines and in fact, wherever a small independent power plant is desirable.

A further object is to provide a construction of combustion engine provided with novel means for lubricating all operating parts subject to wear. In the preferred embodiment, the invention includes novel means and mechanism for facilitating bearing lubrication and for reducing leakage of the lubricant. It also provides means for disposing of the lubricant which finally leaks by and for the return of this lubricant to the crank case for re-use.

Another object of the present invention is to provide a novel construction of means and mechanism for supplying the crank case with the combustible mixture. In the disclosed embodiment, the mixture of fuel, air and lubricant is drawn through the crank shaft and into the crank case at predetermined periods dependent upon the reciprocating suction and compression action in the crank case.

Another object of the present invention is to provide a novel means for controlling the speed of the engine. In its preferred form, this control means includes a throttle valve carried by the crank shaft and centrifugally actuated to control the amount of combustible mixture supplied to the crank case and cylinders and thereby control the engine speed to maintain it at a substantially constant value.

A further object is to provide a novel air intake and filter construction for cleaning and filtering the air supplied to the mixing chamber of the carburetor. This novel construction comprehends a valve or control means for regulating the quantity of air entering the cleaner and thereby regulating the mixture of the fuel and air, and further, the construction and arrangement of the air intake and tortuous path through which the entering air must pass, muffle or silence the intake noises.

A still further object of the present invention is to provide a novel muffler for the exhaust gases whereby these gases must pass through nested sections or cups forming expansion chambers and providing a series of baffles or deflectors against which the exhausted gases impinge before leaving the muffler. The exhaust gases in passing through each muffler section must change their path and direction of travel and rotate or turn through an angle of approximately 90° before entering the succeeding section. Thus the exhaust noises are thoroughly muffled and the noises incident to the operation of a combustion engine of the type disclosed, are appreciably lessened.

Further objects are to provide a construction of maximum simplicity, efficiency, economy and ease of assembly and operation, and such further objects, advantages and capabilities as will later more fully appear, and as are inherently possessed thereby.

The invention further resides in the combination, construction and arrangements of parts illustrated in the accompanying drawings, and while there is shown therein a preferred embodiment, it is to be understood that the same is susceptible of modification and change, and comprehends other details and constructions, without departing from the spirit of the invention.

In the drawings:

Fig. 1 is a plan view of the novel engine.

Fig. 2 is a view in vertical cross section taken on the line 2—2 of Fig. 1.

Fig. 3 is an enlarged view in vertical cross section taken in a plane represented by the line 3—3 of Fig. 1.

Fig. 4 is an enlarged view in vertical cross section taken on the line 4—4 of Fig. 1.

Fig. 5 is a plan view of the intake cap of the air cleaner.

Fig. 6 is a plan view of the filter screen.

Fig. 7 is a view in horizontal cross section taken on the line 7—7 of Fig. 4.

Fig. 8 is a view, part in side elevation and part in vertical cross section, of the governor valve and its position in the crank disc during normal operation of the engine.

Fig. 9 is a view in perspective of the governor valve or plunger.

Fig. 10 is a view in perspective of the crank shaft.

Figs. 11 and 12 are fragmentary sectional views showing the lubricant grooves or slots on the opposite ends of the crank shaft.

Fig. 13 is a view in side elevation of the muffler.

Fig. 14 is a fragmentary view in vertical cross section through the exhaust coupling, hose and exhaust muffler.

Fig. 15 is a view in end elevation of the muffler.

Fig. 16 is a view in vertical cross section taken in a plane represented by the line 16—16 of Fig. 14.

Fig. 17 is a similar view taken in a plane represented by the line 17—17 of Fig. 14.

Fig. 18 is a perspective view of one of the muffler sections.

Referring to the drawings and more particularly to Figs. 1, 2 and 3, the novel combustion engine is shown as mounted upon a base 1 forming the top or cover for a combined fuel and lubricant supply tank 2. In the present form of the invention the fuel and lubricant is mixed in the tank 2 and fed or forced into the crank case by the suction and compression created by the reciprocating pistons. An inlet 3 in the top permits the tank to be filled, while a drain 4 is provided in the base of the tank 2 for emptying the contents. Securing means such as bolts or the like 5, connect and seal the top to the tank.

The engine comprises a crank case 6 housing a crank shaft 7 having aligned ends 8 and 9, spaced crank discs 10, 11 and 12, and connecting crank pins 13 and 14. Upon each of the crank pins is pivotally mounted a piston rod 15 carrying at its opposite end a piston 16 adapted to slide in a cylinder head 17 provided on its exterior with heat radiating fins 18. Each cylinder is mounted upon the crank case at 19 and extends in opposed, but slightly offset relation as shown in Fig. 2. In the end of each cylinder head is mounted a spark plug 20 connected by a lead 21 to an ignition system designated generally as 22, and mounted for rotation upon a fly wheel 23. As the ignition system forms no part of my present invention the details have not been fully disclosed, although it may comprise a construction similar to that shown in the Mikulasek Patent No. 1,932,797 of October 31, 1933.

The engine being of the two-cycle construction, the intake ports 24 and exhaust ports 25 are opened by the sliding piston at the end of each rearward or suction stroke, the exhaust port being opened a trifle earlier than the intake port to permit a complete escape of the burned gases into the exhaust manifold 26 before the fresh charge of fuel mixture enters the cylinder. A deflector 27 formed in the head 28 of the piston prevents the fresh or new charge from blowing out of the cylinder through the simultaneously opened exhaust port by deflecting and thus momentarily delaying the entering fuel charge until the exhaust port is again closed.

In order to supply the crank case with fuel and lubricant there is provided a carburetor 29 which may be molded as an integral part of the cover 1 and crank case 6, or formed separately and attached thereto. This carburetor is provided with a feed tube 30 provided at its lower end with a strainer and check valve 31 for the entering fuel. The feed tube is threaded in a block 32 having a slot 33 for preventing flooding by draining back all free or liquid fuel collected thereabout. The block is provided or formed with a carburetor jet 34 having an opening 35 and outlet 36 of reduced diameters from that of the opening in the feed tube, but all disposed in alignment.

Connected to the carburetor body below the jet or nozzle 34 is an intake connection or neck 37 for the air supply. Upon this neck is mounted an air cleaner 38 consisting of a cup-shaped member or casing 39 threaded onto and locked upon the neck by a suitable lock nut 40. At the enlarged open end of the casing 39 is mounted an intake cap 41 crimped or enlarged at its outer end 42 to seat conformably in the casing and provided with a plurality of openings 43 for the entering air. The central portion of the cap is tapped or threaded at 44 to receive the threaded shank 45 of a cover 46 forming an adjustable knob for controlling the quantity of air permitted to enter the casing.

This knob or cover is formed with an enlargement or skirt 47 adapted to cover or overlap the cap 41 but sufficiently spaced therefrom to permit the air to pass therebetween, thence through the openings 43 and filter screen 48 carried in the cap 41, through the neck 37 and into the mixing chamber 49 in the carburetor, there to be mixed with the fuel to provide a combustible mixture. The knob or cover also provides a hood or shedding device for preventing wash water or other foreign matter from falling into the air intake opening, and is preferably knurled or serrated on the gripping portion and provided with an arrow or other indicator 50 to designate the adjustment. By turning the cover to the right, the quantity of air allowed to enter the cleaner and carburetor is reduced, and the mixture is choked or enriched. In order that the proper adjustment may be maintained, a spring 51 is provided which seats between the cap 41 and knob or cover 46.

The combustible mixture enters the crank case through a rotary valve comprising a slot or sector 52 cut from the end 9 of the crank shaft and communicating with the mixing chamber 49 and a centrally disposed hole or opening 53 in the crank shaft 7. In order to control the quantity of mixture drawn into the crank case the invention comprehends a throttle governor or valve disposed in the crank disc 12 and comprising a plunger 54 slidable in a diametrically disposed opening 55 provided in the central portion of the disc 12. This plunger consists of spaced weights 56 and 57 connected by a stem 58. The weight 56 is hollowed out to receive one end of a spring 59 connected thereto by a pin 59a and its other end connected to and seating against an adjusting screw 60. A tubular collar 60a encompasses the spring 59 and forms a spacer between the governor valve 54 and adjusting screw 60 for the purpose of preventing the governor valve from dropping back against or adjacent to the screw 60, and thereby throwing the center of gravity on the wrong side of the central axis of the disc 12. During operation, the spring 59 acts to pull the plunger back to an open position for free passage of the combustible mixture.

The screw 60 permits an accurate adjustment for correct position and governing speed, for by screwing in this adjusting screw, the governing speed is lowered and by screwing it out the governing speed is increased. This adjustment may be readily accomplished by removal of the plug 61 in the crank case. A screw 62 provides a stop for the governor valve.

In operation, after the screw 60 has been properly adjusted, an increase in speed of the crank shaft 7 and its crank disc 12, will cause centrifugal force acting against the plunger supporting spring 59 to close or substantially close the intake opening at 63. This will partially or completely shut off the supply of the mixture and decrease the speed of rotation, and as the speed decreases, the spring acts to pull the plunger back and completely open the intake. In actual operation, it is not necessary that the governor close completely the intake opening. Consequently the adjusting screw is generally used to merely adjust the governor valve for its closed position. By this construction, the average speed of the engine is maintained approximately constant, regardless of load value since the operation is not one of static equilibrium, but one of periodic oscillation. In other words, under normal operating conditions, the governor or plunger will never be at total rest, except at the extreme positions, but will oscillate back and forth, opening and closing the intake with a period of oscillation determined by the characteristics of the load.

Connected to the exhaust manifold outlet 64 by means of a connector or coupling 65, in an end connection 66 of a flexible exhaust hose 67 leading to muffler 68. The manifold cutlet is preferably threaded at 69 and the end 70 tapered on its exterior to provide a ground joint with the tapered end 71 of the end connection 66. The connector or union 65 is interiorily threaded to mesh with the threads 69 and is further provided with an annular shoulder 72 adapted to engage the complementary shoulder 73 on the end connection 66.

The muffler comprises an end bell or connector 74 threaded to receive the end of the flexible exhaust hose 67. To this end bell is connected a bracket 75 by means of bolts or other suitable connecting means 76. This bracket or plate is centrally threaded to receive the threaded end of a locking bolt 77 having its outer end 78 bearing against an end bell 79 provided with discharge openings 79ª. Intermediate the end bells 74 and 79 are positioned a plurality of muffler sections 80 each provided with diametrically opposed, oblong openings 81 for the passage of the exhaust gases. Each section is also provided with tongues 82 spaced apart 180°, and also grooves 83 spaced apart in a similar manner so that these sections are identical in construction, but when assembled, provide the oppositely disposed discharge openings. This permits a standardization of these parts and their manufacture of identical stampings. Also in view of their contour in which there is provided an offset 84, these cup-shaped sections nest together to provide a tight and leak-proof closure when the locking bolt 77 is tightened.

Each of these sections provides an expansion chamber and the gases passing therethrough are deflected by the side walls, so that their course of travel is continuously changed and they must rotate through an angle of approximately 90° to pass through the successive outlets or openings.

The ignition system 22, flywheel 23 and pulley 85 are mounted upon the reduced end 8ª of the crank shaft. Adjacent the other end 9 of the crank shaft is mounted a foot starter comprising a foot lever 86 adapted to rotate a pinion gear 87 loose on the shaft. This pinion gear is so arranged as to rotate a ratchet 88 suitably keyed at 89 to the shaft, by means of balls 90 adapted to lock the pinion gear and ratchet in one direction of rotation, and thereby rotate the ratchet and shaft in the starting operation.

In order to properly lubricate the bearing surfaces and for reducing oil leakage to the crank case bearings the invention comprehends novel means and mechanism consisting of slinger slots 92 and 93 cut into the crank shaft adjacent the ends of the crank shaft bearings 94 and 95. In the operation of the engine the entering mixture of oil and gasoline acts to lubricate the starter and crank bearing through the rotary intake slot or sector 52. Centrifugal force set up in the space 96 between the crank disc 12 and body of the crank case sucks lubricating mixture over the surface of the starter end bearing 95 and as the mixture is drawn into the crank case, a portion of it will pass through the central opening 53 in the crank shaft to the fly wheel bearing 94 where it is thrown on the bearing surface by centrifugal force through the cross-drilled hole 97 and spiral slot 98. From here it is drawn over the surface of the bearing by the centrifugal force created in the space 99 between the crank disc 10 and the body of the crank case.

Any lubricant which tends to follow the crank shaft to the outside of the crank case is thrown back by the spiral oil slinger slots 92 and 93, although should any finally leak beyond these spiral slingers, it will settle in the reservoirs 100 and 101 and when the level of the lubricant in these reservoirs rises, the spiral oil slingers will pump this oil or lubricant back into the crank case, or in case of the starter end bearing will be sucked into the carburetor through the slot 102. In order to permit ready access to the interior of the crank case, or the removal of the crank shaft and associated parts, the end bearing and plate 103 is made removable.

From the above disclosure and the detailed description in the drawings it will be readily apparent that the invention comprehends a novel construction of internal combustion engine and in the novel parts making up the assembly.

Having thus disclosed the invention,
I claim:

1. In an internal combustion engine, a crank case, a carburetor mounted in the crank case for supplying fuel to the crank case, a crank shaft having a plurality of crank discs and provided with means for transporting the fuel from the carburetor to the crank case, and a centrifugally controlled governor mounted diametrically in one of the crank discs for controlling the supply of combustible fuel to the crank case.

2. In an internal combustion engine, a crank case, a crank shaft rotatable in the crank case and provided with a crank disc, a carburetor for supplying combustible fuel to the crank case, means in the crank shaft for periodically conveying the fuel to the crank case, and a governor carried by the disc for limiting the quantity of fuel entering the crank case.

3. In an internal combustion engine, a crank case, a crank shaft rotatable in the crank case and provided with a crank disc, a carburetor for supplying combustible fuel to the crank case, means in the crank shaft for periodically conveying the fuel to the crank case, and means carried by the disc and dependent upon the speed of rotation of the shaft for controlling the quantity of fuel supplied to the crank case.

4. In an internal combustion engine, a crank case, a crank shaft rotatable in the crank case and including a crank disc, means for supplying a combustible mixture to the crank case, an opening provided in the crank shaft and disc for passage of the combustible mixture, and means in the disc for controlling the amount of combustible mixture entering the crank case.

5. In an internal combustion engine, a crank case, a crank shaft rotatable in the crank case and including a crank disc, means for supplying a combustible mixture to the crank case, an opening provided in the crank shaft and disc for passage of the combustible mixture, and a centrifugally controlled governor mounted in the disc for controlling the amount of mixture passing through the opening in the disc and into the crank case.

6. In an internal combustion engine, a crank case, a crank shaft rotatable in the crank case and including a crank disc, means for supplying a combustible mixture to the crank case, an opening provided in the crank shaft and disc for passage of the combustible mixture, and a governor mounted centrally in the disc and so constructed and arranged as to permit a free flow of the mixture through the opening during normal operating speeds, but when the crank shaft is rotated at excessive speeds, closes the opening to thereby decrease the quantity of mixture entering the crank case and slowing down the speed of rotation to normal.

7. In an internal combustion engine, a crank case, a crank shaft rotatable in the crank case and provided with a centrally disposed opening for passage of the fuel mixture to the crank case and a crank disc, and a governor carried by the disc for controlling the quantity of mixture passing through the opening and comprising a plunger adapted to allow free passage through the opening or partially or completely obstructing this passage and a spring exerting a tension on the plunger for maintaining the plunger in a position to allow free passage.

8. In an internal combustion engine, a crank case, a crank shaft rotatable in the crank case and provided with a centrally disposed opening for passage of the fuel mixture to the crank case and a crank disc, and a governor carried by the disc for controlling the quantity of mixture passing through the opening and comprising a centrifugally actuated member adapted to control the passage of fuel mixture through the opening by controlling the size thereof, a spring connected to the member and exerting a tension thereon to maintain the passage free of obstruction when the shaft rotates at a predetermined speed, but permitting centrifugal force to move the member against the tension of the spring to thereby partially or completely obstruct the opening to limit the quantity of fuel mixture entering the crank case, and means for adjusting the governor for varying the governing speed.

9. In an internal combustion engine, provided with a crank case, a crank shaft adapted to rotate therein, a fly wheel on one end and a starter on the other end of the shaft, bearings for each end of the shaft, an opening disposed longitudinally of the shaft for the passage of a mixture of fuel and lubricant to the crank case, and means on the shaft for lubricating the bearings and returning excess lubricant inwardly along the shaft.

10. In an internal combustion engine, provided with a crank case, a crank shaft adapted to rotate therein, bearings for each end of the shaft, an opening disposed longitudinally of the shaft for the passage of a mixture of fuel and lubricant to the crank case for lubricating all wearing parts therein, means for lubricating the bearings, and means adjacent each end of the shaft for returning excess lubricant inwardly from the ends of the bearings.

11. In an internal combustion engine, provided with a crank case, a crank shaft adapted to rotate therein, bearings for each end of the shaft, an opening disposed longitudinally of the shaft for the passage of a mixture of fuel and lubricant to the crank case and for supplying the bearings with lubricant, and slinger slots provided at the opposite ends of the shaft adjacent the bearings for returning excess lubricant from the ends of the bearings.

12. In an internal combustion engine, provided with a crank case, a crank shaft adapted to rotate therein, crank discs provided on the crank shaft, bearings adjacent the opposite ends of the shaft, a port extending centrally and longitudinally of the crank shaft, a carburetor for supplying a mixture of fuel and lubricant, a rotary intake valve in the shaft and communicating with the carburetor and port for periodically passing a quantity of the mixture into the port and crank case, means for forcing lubricant into contact with the bearings, and slinger slots so formed in the shaft adjacent the ends of the bearings as to return the lubricant inwardly from the ends of the bearings to continuously lubricate the bearing surfaces and reduce leakage at the ends thereof.

13. In an internal combustion engine provided with a crank case, a crank shaft adapted to rotate therein, crank discs provided on the crank shaft and located in close proximity to the end walls of the crank case but providing an annular space therebetween, bearings adjacent the opposite ends of the shaft, a port extending centrally and longitudinally of the crank shaft, a carburetor for supplying a mixture of fuel and lubricant, a rotary intake valve in the shaft and communicating with the carburetor and port for periodically passing a quantity of the mixture into the port and crank case, means for forcing lubricant into contact with the bearings, the annular space between the discs and end walls of the casing setting up centrifugal force which draws the lubricant over the bearing surfaces, and slinger slots formed in the exterior of the shaft for returning the lubricant inwardly from the ends of the bearings and thereby completely lubricate the bearing surfaces and reduce leakage at the ends thereof.

14. In an internal combustion engine provided with a crank case, a crank shaft adapted to rotate therein, a bearing provided adjacent each end of the shaft, a port extending centrally of the crank shaft and into proximity of the bearings, a carburetor for supplying fuel and lubricant to the crank case through the port, means for periodically forcing a quantity of the fuel and lubricant into the crank case and a portion of the lubricant into contact with the bearings, and means for drawing the excess lubricant from the one bearing into the carburetor during the suction stroke.

15. In an internal combustion engine provided with a crank case, a crank shaft adapted to rotate therein, a bearing provided adjacent each end of the shaft, a carburetor adjacent one of the bearings for supplying a mixture of fuel and lubricant to the crank case, means for periodically forcing a quantity of the fuel and lubricant into the crank case and a portion of the lubricant into contact with the bearings, and means for drawing the excess lubricant from the bearing adjacent the carburetor into the carburetor during the suction stroke.

THOMAS R. SMITH.